(12) United States Patent
Frazier et al.

(10) Patent No.: US 11,839,223 B2
(45) Date of Patent: Dec. 12, 2023

(54) CHEESE COMPOSITIONS AND RELATED METHODS

(71) Applicant: General Mills, Inc., Minneapolis, MN (US)

(72) Inventors: Amelia E. Frazier, Minneapolis, MN (US); Nathan S. Morris, Minneapolis, MN (US); Aaron P. Wlaschin, St. Paul, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 17/963,577

(22) Filed: Oct. 11, 2022

(65) Prior Publication Data

US 2023/0041928 A1 Feb. 9, 2023

Related U.S. Application Data

(63) Continuation of application No. 16/910,192, filed on Jun. 24, 2020, now Pat. No. 11,497,225, which is a continuation of application No. 14/648,772, filed as application No. PCT/US2013/043218 on May 30, 2013, now Pat. No. 10,729,152.

(60) Provisional application No. 61/731,551, filed on Nov. 30, 2012.

(51) Int. Cl.
*A23C 19/00* (2006.01)
*A23C 19/093* (2006.01)
*A23C 20/00* (2006.01)
*A23C 19/082* (2006.01)
*A23C 19/09* (2006.01)

(52) U.S. Cl.
CPC ............ *A23C 19/00* (2013.01); *A23C 19/082* (2013.01); *A23C 19/09* (2013.01); *A23C 19/093* (2013.01); *A23C 20/00* (2013.01)

(58) Field of Classification Search
CPC ..... A23C 20/00; A23C 19/093; A23C 19/082; A23C 19/00; A23C 19/09
USPC .......................................................... 426/582
See application file for complete search history.

(56) References Cited

U.S. PATENT DOCUMENTS

| | | |
|---|---|---|
| 4,089,981 A | 5/1978 | Richardson |
| 5,061,503 A | 10/1991 | Kong-Chan et al. |
| 5,336,515 A | 8/1994 | Murphy et al. |
| 5,629,037 A | 5/1997 | Gaffney |
| 5,665,414 A | 9/1997 | Sherwood et al. |
| 5,725,676 A | 3/1998 | Chiu et al. |
| 5,932,017 A | 8/1999 | Chiu et al. |
| 6,231,675 B1 | 5/2001 | Chiu et al. |
| 7,807,207 B2 | 10/2010 | Huang et al. |
| 7,815,957 B2 | 10/2010 | Smith et al. |
| 2002/0015759 A1 | 2/2002 | Prosise et al. |

(Continued)

OTHER PUBLICATIONS

Centara (TM) Pea Hull Fiber (Nutri-Pea Ltd), http://ethorn.com/wp-content/uploads/2016/09/Nutri-Pea.pdf, accessed Feb. 2019 (Year: 2016).

(Continued)

*Primary Examiner* — Subbalakshmi Prakash
(74) *Attorney, Agent, or Firm* — Diederiks & Whitelaw, PLC; Rachel A. Kahler

(57) ABSTRACT

Described are cheese compositions and methods of making cheese compositions, including methods of formulating cheese compositions, wherein the cheese compositions may include combinations of casein protein, fiber, non-casein protein, non-pregelatinized, modified starch, and a fat component.

17 Claims, 7 Drawing Sheets

(56) References Cited

U.S. PATENT DOCUMENTS

| | | |
|---|---|---|
| 2005/0158433 A1 | 7/2005 | Jacobson et al. |
| 2006/0159825 A1 | 7/2006 | Smith et al. |
| 2008/0160133 A1 | 7/2008 | Brooks et al. |
| 2008/0199590 A1 | 8/2008 | Kincs et al. |
| 2012/0064195 A1 | 3/2012 | Erickson et al. |

OTHER PUBLICATIONS

Microcrystalline Cellulose, http://www.fao.org/fileadmin/use_upload/jeefa_additives/docs/Monograph1/Additive-280.pdf (Year: 2000).

CHEESE COMPOSITIONS AND RELATED METHODS

CROSS-REFERENCE TO RELATED APPLICATIONS

The present application represents a continuation of U.S. patent application Ser. No. 16/910,192, filed Jun. 24, 2020, entitled "Cheese Compositions and Related Methods", pending, which is a continuation of U.S. patent application Ser. No. 14/648,772, filed Jun. 1, 2015, entitled "Cheese Compositions and Related Methods", issued as U.S. Pat. No. 10,729,152, which is a U.S. National Stage of International Application Serial No. PCT/US13/43218, filed May 30, 2013, which claims priority under 35 USC § 119(e) from U.S. Provisional Patent Application having Ser. No. 61/731,551, filed Nov. 30, 2012, entitled "Cheese Compositions and Related Methods". The content of these applications is incorporated herein by reference.

FIELD OF INVENTION

The invention relates to cheese compositions, methods of making the cheese compositions, and food products that include the cheese compositions. In particular, the invention is directed to cheese compositions that can include fat, casein protein, water, optional fiber, optional non-casein protein, and optional starch.

BACKGROUND

In the ongoing development of food products, various motivations exist to substitute certain food ingredients for other food ingredients. Cost can be a motivation, as can availability of an ingredient, health reasons, the ability to process a commercial product, and stability and flavor properties of a commercial product.

Cheese compositions are no exception. Various reasons exist, such as cost, for food product development to attempt to reduce levels of certain ingredients such as casein protein and replace at least a portion of the reduced amount of the casein protein with a protein or non-protein substitute ingredient. Casein protein is a protein, naturally found in milk, that can provide a cheese composition with desired functional, organoleptic, and nutritional properties. One reason to use a substitute ingredient for casein protein is the possibility of reducing total cost of a cheese composition.

But replacing a conventional cheese composition ingredient such as casein protein can present many expected or unexpected technical hurdles. Cheese compositions are complex compositions and their properties can be sensitive to the presence of certain ingredients, in functional amounts. Thus, conventional cheese manufacturing has come to rely on certain cheese composition ingredients to provide certain properties.

The ability to replace casein protein with a suitable substitute ingredient can be significantly limited and unpredictable. The replacement ingredient should produce a cheese composition having desired functional, organoleptic, and nutritional properties. For example, replacing casein with a non-casein ingredient can tend to result in a cheese composition that exhibits less than desired functional properties (e.g., melt, stretch, and firmness). Similarly, a replacement ingredient can potentially impart a different, sometimes less desirable, flavor, color, or texture to a cheese composition. Furthermore, a replacement ingredient has the potential of affecting nutritional characteristics of a cheese composition, e.g., the cheese composition may not satisfy nutritional standards imposed by the United States Department of Agriculture, the Food and Drug Administration, or the Code of Federal Regulations. Conventional cheese making has come to rely on the mere presence and sometimes quantity of casein protein to provide certain cheese composition properties.

Another ingredient that is commonly found in cheese compositions is fat, which often contains an amount transfat. Recent consumer trends indicate that trans-fatty acids (i.e., "trans-fat") in food products are desirably avoided, to increase healthfulness. Accordingly, many food product marketers are finding ways to provide consumers with food products having reduced or substantially no trans-fat content. Food manufacturers would like to provide consumers with food products (e.g., cheese compositions and food products that include cheese (e.g., snack food (e.g., frozen snack food) including pizza, pizza-type snack food, and the like)) having a low amount of trans-fat (e.g., about 5 weight percent or less of trans-fat based on the total weight of the fat). However, changing the formulation of a food composition to reduce trans-fat levels can present significant technical hurdles. Certain trans-fat-containing ingredients have been relied on to produce desired properties in food products and food product intermediates. Changing the trans-fat content of a food product can significantly impact properties such as processing properties, organoleptic properties, combinations of these, and the like, of the food product.

Cheese compositions are complex chemical compositions. Cheese composition properties such as melt, crumble, stretch, firmness, etc., could be undesirably affected by reduced trans-fat content. Accordingly, there is motivation to provide cheese compositions having a low amount of transfat, while at the same time substantially maintaining or even improving cheese composition properties such as melt, crumble, stretch, firmness, and the like. In addition, there is a strong need to provide food products that include such cheese compositions and methods of making such cheese compositions and food products.

SUMMARY

The present description relates to cheese compositions that include relative reduced amounts of casein protein. As a substitution for casein protein, the cheese composition may include fiber. The cheese compositions may include ingredients that include fat, casein protein, fiber, and water, optionally also starch, non-casein protein, or both starch and non-casein protein. Desirably, such a cheese composition, having a reduced amount of casein protein, can still exhibit one or more suitable functional, organoleptic, and nutritional properties. The cheese compositions that include casein protein in a reduced amount can include an amount that is below 20 weight percent based on the total weight of the cheese composition, for example from 10 to 20 weight percent casein protein based on the total weight of the cheese composition, or from 12 to 17 weight percent casein protein based on the total weight of the cheese composition.

Certain described cheese compositions contain an amount of fiber, e.g., as an ingredient added to replace some or a portion of the reduced amount of casein protein (a caseinprotein replacement). Fiber as a replacement for casein protein can be used optionally in combination with one or more other casein-protein replacements such as non-casein protein, starch, or both. Certain types of starch can be particularly useful, such as non-pregelatinized, modified starch, with certain particularly preferred modified starches including non-pregelatinized, thermally-inhibited starch. Preferred non-casein protein can include vital wheat gluten. A cheese composition that includes fiber and other optional casein-replacement ingredients can optionally also include a fat selected to provide useful functional properties in the cheese composition such as firmness, melt, crumb, stretch, etc.; to produce these properties the fat may exhibit desired properties such as Solid Fat Content and melting point properties as described herein.

Fiber refers to any of a variety of generally non-starch polysaccharides such as arabinoxylans, cellulose, cellulose derivatives and modified cellulose, resistant starch, resistant dextrins, inulin, lignin, waxes, chitins, pectins, beta-glucans, and oligosaccharides. Fibers include polysaccharides sometimes referred to as hydrocolloids, examples including xanthan gum, gum Arabic, guar gum, locust bean gum, cellulose derivatives such as carboxymethyl cellulose, and alginate. Fiber can be considered to include soluble fiber and insoluble fiber. Soluble fiber may be fermented in the human colon, while insoluble fiber may be metabolically inert to humans. Preferred types of fiber for use according to the present description include insoluble fibers such as cellulose and oat bran fiber.

According to cheese composition embodiments that contain fiber, e.g., cellulose, oat fiber, or the like, the fiber can be present as an ingredient of a cheese composition and distributed throughout the cheese composition. For example, the cheese composition can be a mixture of ingredients or an emulsion that includes fat, protein, and water, with fiber being combined with those ingredients during preparation to become distributed throughout the mixture or emulsion and final cheese composition. Stated differently, according to these specified embodiments the fiber is not fiber that is applied or present exclusively at a topical location, at a surface of the cheese composition (although topically applied fiber may also be present, in addition to fiber distributed within the mixture or emulsion). In specific, these cheese compositions are different from compositions wherein a powder such as cellulose is topically applied at a surface of a cheese composition, for example as is done with certain commercial shredded mozzarella cheese products, such as to prevent shredded pieces from sticking together.

In the same or in alternate embodiments, meaning either in a cheese composition that includes fiber as a replacement for casein protein, or alternately in a cheese composition that does not contain fiber as a replacement for casein protein, a cheese composition as described can include interesterified fat that has a reduced trans-fat content. A suitable interesterified fat can include less than about 5 weight percent trans-fat based on the total weight of the fat, such as below about 2 weight percent trans-fat, or below 1 weight percent or 0.5 weight percent trans-fat, based on total weight fat in the cheese composition. Useful or preferred interesterified fats (e.g., enzymatically interesterified fats) can be identified as exhibiting one or a combination of desired mechanical or compositional features including melt point, solid fat content, or both. In specific, an interesterified fat can exhibit a solid fat content as follows: from 20 to 40 percent at 10 C, and below 15 percent at 40.0; e.g., from 22-34 percent at 10 C, from 18-27 percent 21.1 C, from 10-18 percent at 26.7 C, from 8-17 percent at 33.3 C, and from 6-15 percent at 40.0 C. An interesterified fat can alternately or additionally exhibit a melting point of from 120 F to 145 F, e.g., from 125 F to 140 F, as measured by a Mettler Dropping Point testing procedure. Particularly useful interesterified fats can exhibit both the recited solid fat content and the recited melting point.

Embodiments of cheese compositions can include fat that includes the interesterified fat as a major fat ingredient or preferably the only fat ingredient; of the total amount of fat in the cheese composition, the interesterified fat can make up at least 80 percent of the total, at least 90 percent of the total, or at least 95 or 99 percent of the total fat. An exemplary interesterified fat can be prepared from (i.e., can comprise, meaning can be prepared by interesterifying) soybean oil and hydrogenated soybean oil, although other fat sources are also useful.

The described cheese compositions containing fiber, low-trans-fat (e.g., interesterified fat), or optionally both, can optionally also include starch, non-casein protein, or both starch and non-casein protein, to produce a finished cheese product having desired properties. See for example U.S. Pat. Nos. 7,815,957 and 7,807,207, the entireties of which are incorporated herein by reference. Examples of desired properties of a finished cheese product include stretch (e.g., as measured by the Stretch Value Test), melt (e.g., as measured by the Melt Value Test), crumble (e.g., as measured by the Crumble Value Test), stickiness (e.g., as measured by the Stickiness Value Test), and firmness (e.g., as measured by the Firmness Value Test), with desired measured values of these tested properties being described herein.

A cheese composition that contains either fiber, low trans-fat oil, or both, optionally along with starch, non-casein protein, or both starch and non-casein protein, can exhibit useful or desirable functional, organoleptic, and nutritional properties, even with a reduced level of casein protein. One example of a particular desirable cheese composition property can be a "Firmness Test Value" as measured using a TA.XTPlus Texture Analyzer (using a sample temperature of 40° F.), which produces a Firmness Test Value with units of kilograms force (kg(f)). Particularly useful cheese compositions can exhibit a Firmness Test Values of at least 2 or 3 kg(f), e.g., a Firmness Test Value in a range from 2 to 8 kg(f), e.g., from 3.5 to 7 kg(f).

Other desirable properties of a cheese composition can include qualities typical of commercial cheese compositions. For example, important qualities of certain mozzarella cheese compositions used on pizza can include machinability during manufacture, depositing performance, shred integrity, freeze/thaw stability, melt, stretch, pizza bake performance, taste, odor, and color. Other desirable qualities include qualities of a cheese composition during one or more stages of processing such as, for example, emulsification. Certain embodiments of cheese compositions as described can be less sensitive to casein protein quality in that emulsification can be enhanced by use of one or more particular starches such as non-pregelatinized, thermally-inhibited starch.

According to another aspect of the present description, a method of formulating a cheese composition includes a step of reducing an amount of a casein protein in a formulation, while maintaining desired functional properties. Reduced casein protein, with certain maintained functional properties, can be accomplished by incorporating an amount of fiber into the formulation to replace an amount of casein protein that is removed (the "reduced amount" of the casein protein). The amount and type of fiber can be selected based upon information that includes desired functional characteristics of the cheese product, e.g., the Firmness Test Value, and other test values. This method can optionally and preferably also include formulating the cheese composition to include low trans-fat oil, and non-pregelatinized, modified starch as described, or an interesterified (e.g., enzymatically) fat as described.

The present description also relates to methods of making a cheese composition, the method including steps of formulating ingredients for a cheese composition containing reduced casein protein, combining and mixing the ingredients to form a mixture, and heating and cooling the mixture to provide a cheese composition. The final cooled mixture may usually be in the form of an emulsion. The cheese composition ingredients include fat, casein protein, optional non-casein protein, optional starch, optional fiber (e.g., hydrocolloid such as cellulose), preferably an emulsifying salt component, and water (e.g., presented as liquid water, steam, or both). The fat can optionally and preferably be a low-trans-fat, such as an interesterified fat. The cheese, containing any combination of these ingredients, can desirably exhibit a "Firmness Test Value" as measured using a TA.XTPlus Texture Analyzer, of at least 2 kg(f), e.g., from 2 to 8 kg(f), e.g., from 3.5 to 7 kg(f).

In one aspect, the invention relates to a cheese composition. The cheese composition contains: from 20 to 30 weight percent fat; casein protein, in an amount of not greater than 20 weight percent; from 1 to 5 weight percent fiber; emulsifying salt, and from 25 to 50 weight percent water.

In another aspect the invention relates to a cheese composition that includes: from 20 to 30 weight percent interesterified fat having a Solid Fat Content in a range from 20 to 40 percent at 10 degrees Celsius and less than 15 percent at 40 degrees Celsius; casein protein in an amount that does not exceed 20 weight percent; and from 25 to 50 weight percent water; and emulsifying salt.

In yet another aspect the invention relates to a cheese composition that includes: from 20 to 30 weight percent interesterified fat having a melting point in a range from 120 to 145 F; casein protein in an amount that does not exceed 20 weight; from 25 to 50 weight percent water; and emulsifying salt.

The invention in another aspect relates to packaged food products that include a cheese composition as described, and in another aspect relates to methods of making a cheese composition as described.

DETAILED DESCRIPTION

Figure 1:
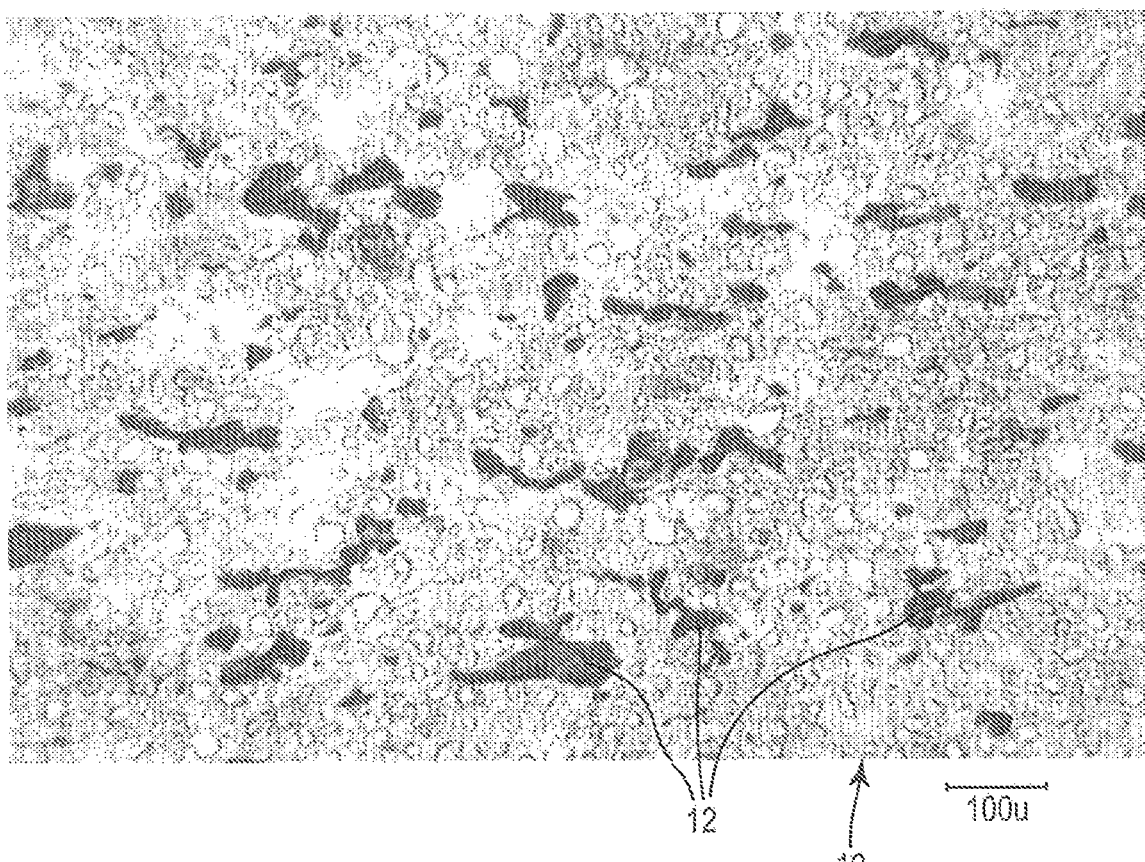
FIG. 1 is a photomicrograph of a cross-sectional view of a cheese composition that includes non-pregelatinized, thermally-inhibited starch.

In general, cheese compositions may be classified as either natural cheese compositions or non-natural cheese compositions. However, the classification of cheese compositions may vary within the cheese industry.

As used herein, the term "cheese composition" refers to a composition used to make a cheese composition, or a final cheese composition itself. The term "cheese composition" could refer to a composition during one or more stages of cheese manufacturing, such as after the cheese composition ingredients are being mixed together to form a mixture. The term "cheese composition" also refers to the mixture of cheese ingredients being further processed by heating or cooling, and additionally to the cooled final cheese composition or final cheese product, ready to be sold for human consumption such as a snack (e.g., the cheese composition could be in the form of shredded cheese, diced cheese, crumbled cheese, a cheese sauce, combinations of these, and the like, alone or in combination with other ingredients as a food product, such as in the form of a pizza or pizza roll, lasagna, etc.). The cooled final cheese composition typically takes the form of an emulsion.

Natural cheese compositions are made directly from milk and are characterized differently from the presently described "cheese compositions." The United States Department of Agriculture (USDA) has specific standards for natural cheese compositions including ingredients used, manufacturing procedures used, and final nutritional value. Non-natural cheese compositions include substitute cheese compositions, process cheese substitutes, and imitation cheese compositions. In general a "substitute cheese composition" means a product that is a substitute for, and resembles another cheese, yet is not nutritionally inferior. 21 C.F.R. §§ 101.3 and 102.5, the respective entireties of which references are incorporated herein by reference, defines substitute and imitation food products (e.g., cheese compositions). A substitute mozzarella cheese is further defined by 21 C.F.R. §§ 133.3, 133.5, and 133.155, the respective entireties of which references are incorporated herein by reference. As used herein, an "imitation cheese" composition means a cheese composition that resembles another cheese but is nutritionally inferior.

The described cheese compositions are non-natural cheese compositions (e.g., cheese substitutes or imitation cheese composition) that include a relatively reduced amount of casein protein when compared to otherwise comparable cheese compositions, while preferably providing functional, organoleptic, and nutritional properties that are suitable for a cheese composition, even with a level of casein protein that is reduced to a level that might otherwise decrease such desired properties. The described cheese compositions are not necessarily limited to one or more specific cheese composition classification (e.g., mozzarella or American cheese), but are directed to cheese compositions generally, wherein it is desired to reduce the casein protein level while providing or maintaining suitable cheese composition properties. Preferred cheese compositions of the invention are "substitute cheese" compositions and "imitation cheese" compositions.

Certain embodiments of cheese compositions as described herein include a reduced amount of casein protein, with the amount of the reduction in casein protein (the "reduced amount") being replaced in part or entirely with fiber. Additional casein-replacement ingredients can also be optionally included in the cheese compositions, such as any one or combination of: non-casein protein (e.g., whey, whey protein isolates or non-dairy protein such as vital wheat gluten); starch, preferably non-pregelatinized, modified starch (e.g., non-pregelatinized, thermally-inhibited starch. Certain preferred embodiments may contain fiber, non-casein protein, and starch (e.g. the non-pregelatinized, modified starch).

Other embodiments of cheese compositions include a reduced amount of casein protein along with a low transfat-containing interesterified fat. These embodiments may include fiber, but are not required to include fiber as a casein-protein replacement. These embodiments may include other casein protein replacement ingredients such as starch and non-casein protein. The interesterified fat can exhibit a Solid Fat Content that produces an increased firmness compared to other fats, and a higher melt point as measured by Mettler Dropping Point.

TABLE 1

| Solid Fat Content | Interesterified Soybean Oil and Hydrogenated Soybean Oil | Palm and Soybean Oil |
| --- | --- | --- |
| @ 10° C. | 20 to 40 percent (e.g., 22-34 percent) | 36-42 percent |
| @ 21.1° C. | 18-27 percent (preferred) | 14.5-19.5 percent |
| @ 26.7° C. | 10-18 percent (preferred) | 8-12 percent |
| @ 33.3° C. | 8-17 percent (preferred) | 4-8 percent |
| @ 40.0° C. | Below 15 percent (e.g., 6-15 percent) | 0-4 percent |
| Mettler Dropping Point | 125-133° F. | 97-105° F. |

In these described embodiments, all or a portion of the amount of the reduction in casein protein (the "reduced amount") can be replaced with any one or a combination of fiber, non-casein protein (e.g., non-dairy protein such as vital wheat gluten), and non-pregelatinized, modified starch (e.g., non-pregelatinized, thermally-inhibited starch).

A cheese composition as described can be a non-natural cheese composition designed to mimic a type of natural or non-natural cheese or cheese product, e.g., American cheese, mozzarella cheese, cheddar cheese, and the like. Examples include non-natural mozzarella cheese compositions, cheddar cheese compositions, American cheese compositions, and the like. Preferred cheese compositions include mozzarella substitute cheese compositions.

The cheese composition can be included as an ingredient or component of a food product that includes the cheese composition, such a pizza, pizza-type snack food, pizza roll, "hot pockets," sandwiches, hoagies, Italian foods such as lasagna and spaghetti, and the like, as well as cheese-stuffed foods such as jalapeno poppers, and others including barbeque chicken wings and spicy chicken products. Preferred food products can include mozzarella substitute cheese compositions. Any of these products may be prepared, packaged, frozen, stored, and optionally shipped in a frozen state for commercial distribution and sale. The frozen food can be stored frozen for an extended period and eventually used by a private consumer or commercial user by heating the frozen food product (with optional thawing) in a conventional, convection, or microwave oven.

In general, cheese compositions as described include casein protein, fat, and water (optionally provided as steam), with various possible additional ingredients including fiber, non-casein protein, and starch, as described. The cheese composition also preferably includes an emulsifying salt, and optionally various other additives such as color, flavorant, preservative, etc. Cheese composition can contain ingredients in the following amounts or as otherwise indicated herein, preferably with these ingredients distributed within the composition as a mixture or an emulsion:

TABLE 2

| Ingredient | Amount in Weight Percent | |
| --- | --- | --- |
| Casein protein | Up to 20, e.g., from 10 to 20 | 12 to 17 |
| Fat | 15 to 35, e.g., 20 to 30 | 22 to 27 |
| Fiber | 1 to 5 | 2 to 4 |

TABLE 2-continued

| Ingredient | Amount in Weight Percent | |
| --- | --- | --- |
| Water | 25 to 50 | 25 to 50 |
| Non-casein protein | 0 to 5 | 1 to 4 |
| Starch | 0 to 6 | 1 to 4 |
| Emulsifying salt | 0 to 5 | 0.5 to 4 or 1 to 3 |

The fat can include one or more fat ingredient, as desired, of a type and in an amount to provide desired functional properties in the resultant cheese composition. The type and amount of fat can affect properties of the cheese composition such as melt, crumble, stretch, firmness, final texture, etc. Fat ingredients are commonly and synonymously referred to as a fat, shortening, or oil. Fat can be either liquid or solid at room temperature, or a combination of liquid and solid at room temperature (i.e., semisolid). Useful fat ingredients can include vegetable fat, dairy fat, and combinations thereof. As described in certain embodiments of the invention, fat is typically vegetable fat.

Exemplary fat ingredients include all vegetable fats and oils, individual ingredients or blends thereof, fractionated, interesterified, or fully hydrogenated. Examples of such fat ingredients include hydrogenated coconut oil, cottonseed oil, soybean oil, groundnut oil, palm oil, palm kernel oil, corn oil, canola oil, safflower oil and combinations thereof. These fat ingredients are well known and are commercially available.

In general, a useful amount of fat in a described cheese composition can include an amount that provides suitable properties such as cheese composition flavor, texture, processing, stability, and melting properties. Such an amount can be in a range from about 15 to about 35 weight percent fat based on total weight of the cheese composition, more preferably from about 20 to about 30 weight percent fat based on the total cheese composition, or from 22 to 27 weight percent.

In certain embodiments a fat having a low amount of trans-fat can be included to provide a cheese composition having low trans-fat content while still maintaining or possibly even improving desired properties such as melt, crumble, stretch, firmness, final texture, combinations of these, and the like. A fat that is considered to include a low amount of trans-fat can mean a fat that contains about 5 weight percent or less trans-fat based on the total weight of the fat. In other embodiments, the fat can include about 2 weight percent or less, about 1.5 weight percent or less, about 1.25 weight percent or less, about 1 weight percent or less, or even about 0.5 weight percent or less trans-fat based on the total weight of the fat. In certain preferred embodiments, the fat contains substantially no trans-fat.

Suitable fat ingredients that have low trans-fat content include palm oil, palm oil fractions, and blends palm oil, palm oil fractions, or both, with another vegetable oil (e.g., cottonseed oil and/or canola oil). Palm oil and palm oil fractions can be particularly preferred fat ingredients.

Fat ingredients that have low trans-fat content are available on a commercial basis. Suitable low trans-fat ingredients include "soft palm mid fraction" (SPMF) and "soft stearin fraction" (SSF). In certain embodiments, a SPMF or SSF fat ingredient can have an iodine value (IV) in the range of 40-55, or possibly 45-50. However in some embodiments a fat can have an IV value as low as 33 (palm stearin) or as high as 60 (palm olein). Procedures for obtaining the iodine value are well-known, such as AOCS Cd 1c-85.

In some embodiments a blend of fats may be used. For example the 60% SPMF/SSF and 40% (by weight) cottonseed oil blend can be a preferred blend of fats for use in a cheese composition.

Certain suitable fats having a low trans-fat content can be identified by, e.g., determining the Solid Fat Content according to the procedure described hereinbelow, at one or more temperatures including, for example, shred temperature (e.g., about 4° C.), mouth temperature of a consumer (e.g., about 37.1° C.), combinations of these and the like. In certain embodiments, a fat can have a Solid Fat Content value in the range from about 30 percent to about 50 percent at 10 degrees Celsius, and less than about 10 percent at 37.8 degrees Celsius. As described herein, fats that exhibit alternate ranges Solid Fat Content, at different temperatures, are useful in alternate embodiments.

Figure 4:
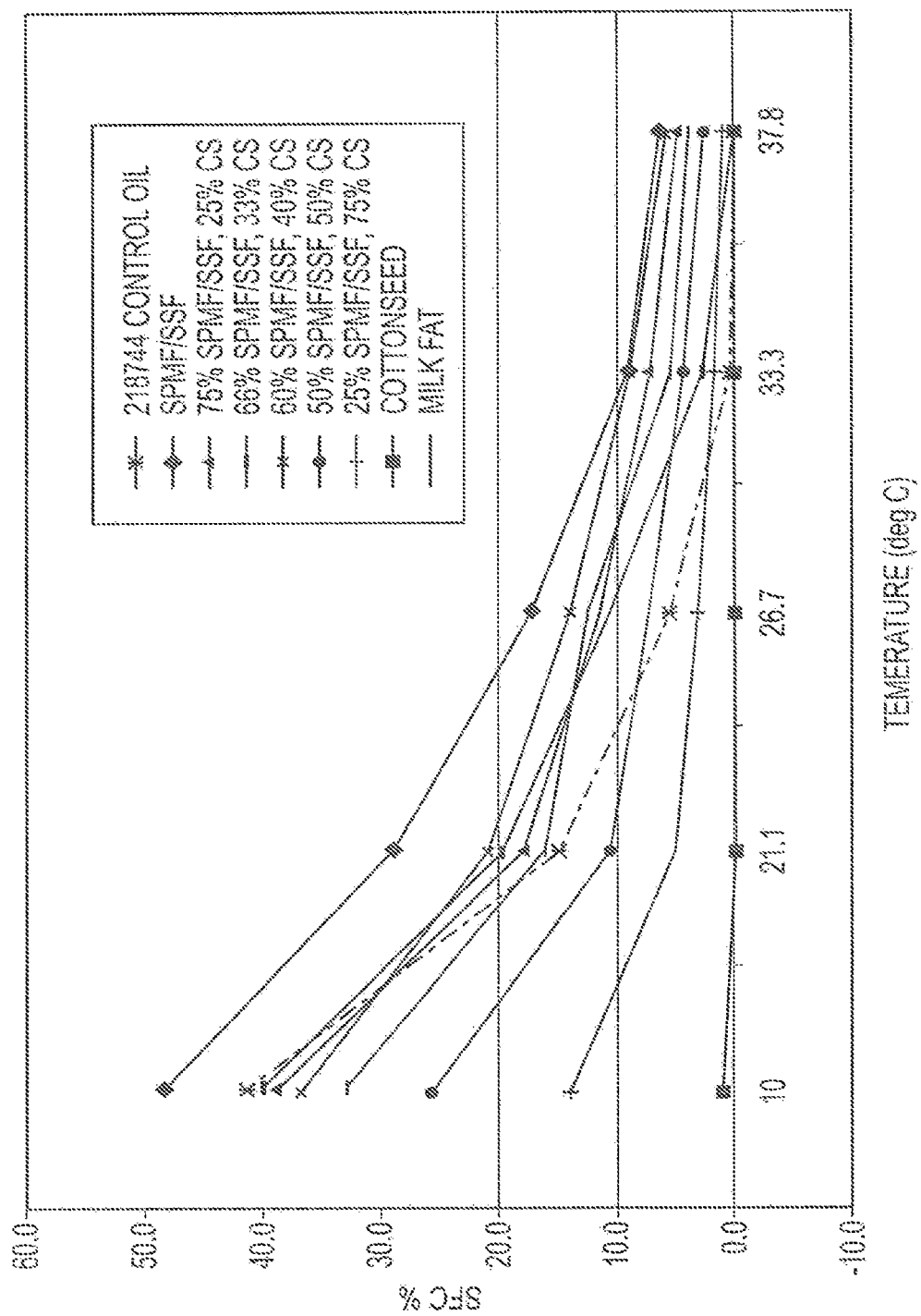
FIG. 4 is a graph showing Solid Fat Content profiles for certain fat ingredients.

FIG. 4 shows a graph of Solid Fat Content profiles that were determined for certain fat ingredients according to the Solid Fat Content procedure described below at various temperatures. The profile for the fat ingredient identified as 218744 Control is an exemplary base-line of a preferred Solid Fat Content profile for a fat ingredient for use in a cheese composition (note: the 218744 Control is relatively high in trans-fat such that it would be unacceptable for use in a cheese composition of the invention). 218744 Control is considered a good base-line for comparison of other fat ingredients because of its similarity in Solid Fat Content profile to that of milk fat which is another exemplary base-line fat ingredient. Accordingly, one or more fat ingredients, including blends of fat ingredients, having an acceptably low level of trans-fat content can have their Solid Fat Content profile compared against a base-line such as 218744 Control to determine whether they would be acceptable as part of a fat component of the invention.

In FIG. 4, the Solid Fat Content profile is shown for the following fat ingredients (including blends of fat ingredients): Control 218744 (partially hydrogenated soybean oil having about 17% saturated fat and about 35% trans-fat and obtained from Golden Foods Golden Brand (Louisville, KY); SPMF/SSF (palm oil fractions having about 55% saturated fat and about 1% trans-fat); cottonseed oil (having about 26% saturated fat and about 2% trans-fat and obtained from Bunge Foods, St. Louis, MO); milk fat obtained from Grassland Dairy Products, Inc., Greenwood, WI; and various blends of cottonseed oil and SPMF/SSF oil. The cottonseed oil/(SPMF/SSF) blends have the following saturated fat and trans-fat content: 25% cottonseed/75% SPMF/SSF blend (47.8% saturated fat and 1.3% trans-fat); 33% cottonseed/66% SPMF/SSF blend (44.9% saturated fat and 1.1% trans-fat); 40% cottonseed/60% SPMF/SSF blend (43.4% saturated fat and 1.4% trans-fat); 50% cottonseed/50% SPMF/SSF blend (40.5% saturated fat and 1.5% trans-fat). A preferred oil blend in FIG. 4 for use in the invention is the blend having 60% SPMF/SSF and 40% cottonseed oil.

Figure 5:
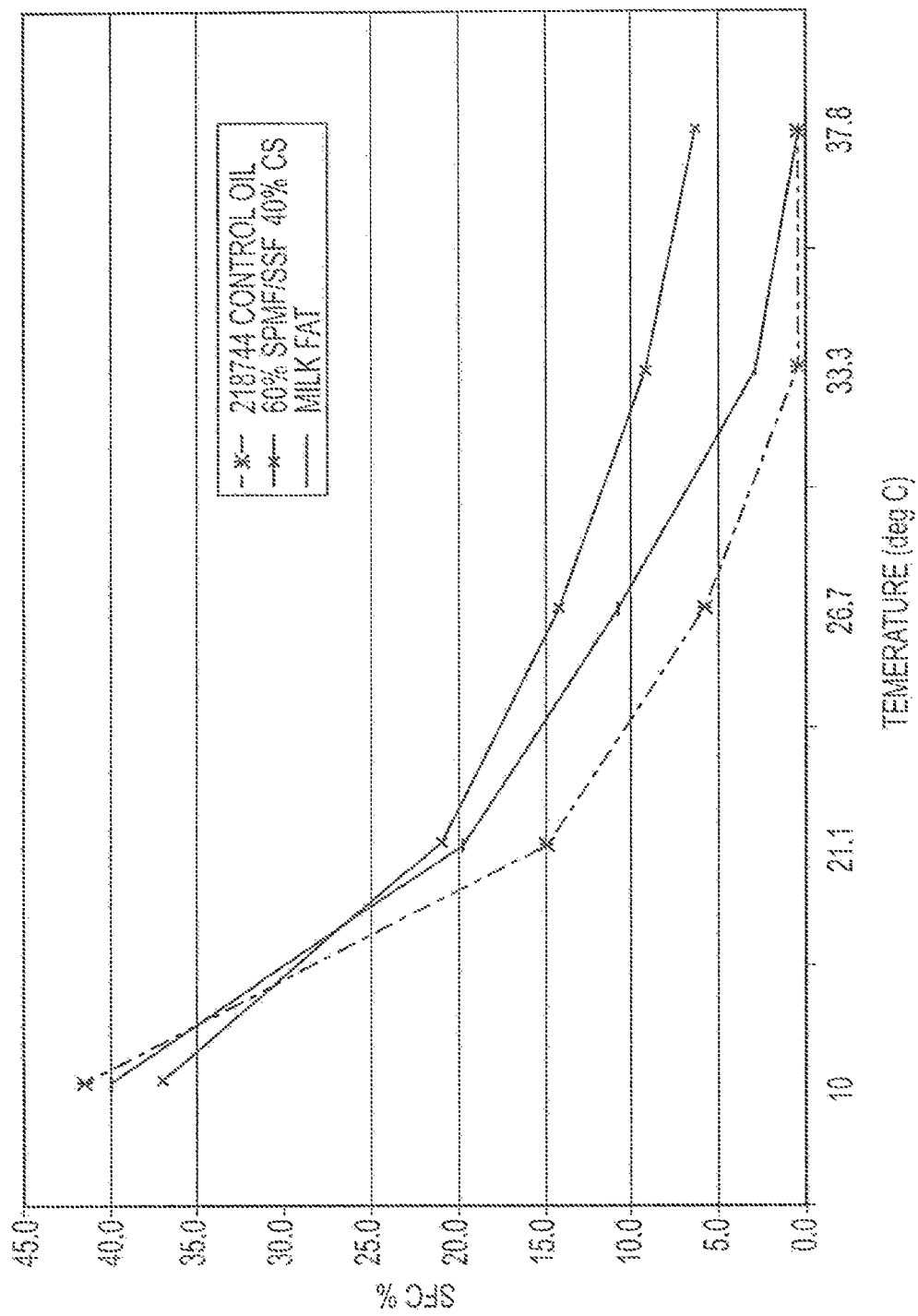
FIG. 5 is a graph showing Solid Fat Content profiles for certain fat ingredients.

FIG. 5 shows another Solid Fat Content profiled for the following fat ingredients described above with respect to FIG. 4: Control 218744, milk fat, and blend having 60% SPMF/SSF and 40% cottonseed oil.

Figure 6:
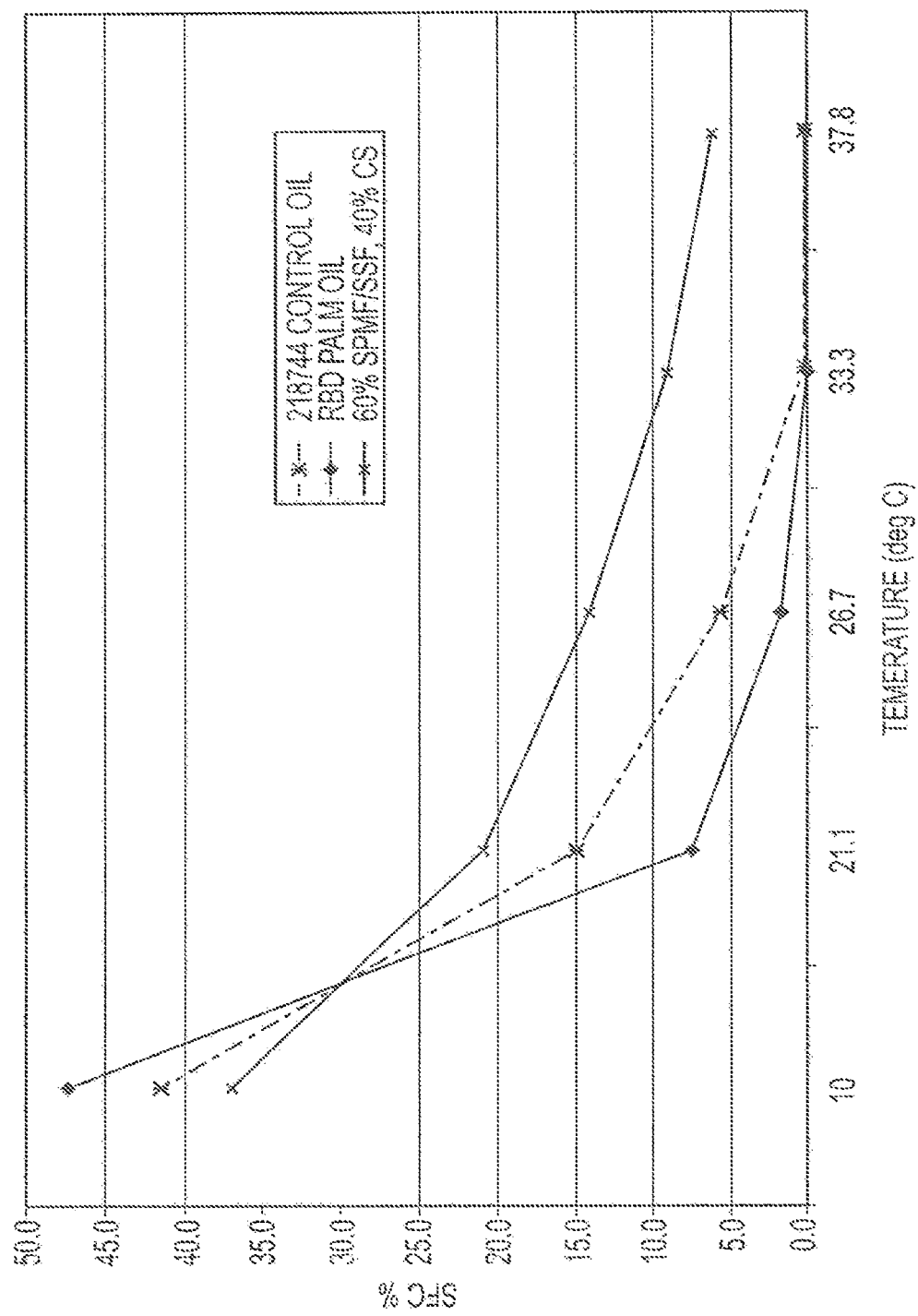
FIG. 6 is a graph showing Solid Fat Content profiles for certain fat ingredients.

FIG. 6 shows another Solid Fat Content profiled for the following fat ingredients: Control 218744 (discussed above), blend having 60% SPMF/SSF and 40% cottonseed oil (discussed above), and a refined, bleached, deodorized (RBD) palm oil (having a trans-fat content of about 1%).

In certain particular embodiments of cheese compositions described herein the low-trans fat may be an interesterified fat, e.g., an interesterified fat having solid fat content and melting point characteristics that produce improved functional properties of the cheese composition.

An interesterified fat can be derived from at least two different fat components. Interesterified fats are known fat compositions derived from fat components by the interesterification process. The term "interesterified" fat is understood to refer to the fat composition that results from the interesterification of one or more fat component, according to which fatty acids have been moved from one triglyceride molecule to another within the fat composition. At room temperature an interesterified fat may take the form of a liquid or a solid. The interesterified fat produced by interesterification of one or more different fat components will not continue to contain the original fat component or components in original form. Upon interesterification, a product interesterified fat will contain the product of the interesterification process, which is the resultant fat that contains the original fat components (mainly triglycerides) with the fatty acid components of each of the original triglycerides rearranged between the original triglyceride molecules, i.e., interesterified. As is understood, an "interesterified fat" that is said to "comprise" one, two, or more different fat components refers to an interesterified fat derived from or prepared by interesterification of the one, two, or more original fat components.

A preferred interesterified fat can be an interesterified fat that exhibits a Solid Fat Content that produces a cheese composition having an increased firmness (i.e., Firmness Test Value) compared to a cheese composition prepared with a different fat. Additionally or alternately, a preferred interesterified fat can be an interesterified fat that exhibits a melting point that results in a cheese composition having an increased firmness (i.e., Firmness Test Value) compared to a cheese composition prepared with a different fat.

Interesterified fats are well known and commercially available. For example, interesterified soy oil is commercially available from, e.g., ADM Food Ingredients, Olathe, KS.

A useful amount of interesterified fat in a described cheese composition can be an amount that provides suitable cheese composition properties such as one or a combination of flavor, texture, processing, stability, firmness, crumb, stretch, melting properties, etc. An exemplary amount can be in a range from about 15 to about 35 weight percent interesterified fat based on total weight of the cheese composition, more preferably from about 20 to about 30 weight percent based on the total cheese composition, or from 22 to 27 weight percent. The interesterified fat can be a major portion of the total amount of fat present in a cheese composition. Optionally, interesterified fat (e.g., enzymatically interesterified fat) may be the only fat ingredient. Alternately, interesterified fat (e.g., enzymatically interesterified fat) can make up at least 80 percent of the total amount of fat in a cheese composition, at least 90 percent of the total amount of fat, or at least 95 or 99 percent of the total amount of fat in the cheese composition. An exemplary interesterified oil can be prepared from (i.e., comprise) soybean oil and hydrogenated soybean oil, although other fat sources are also useful.

Protein can influence functional, organoleptic, and nutritional properties of a cheese composition. Protein generally forms a three-dimensional network within a cheese composition and can influence melt, stretch, machinability, depositing performance, freeze/thaw stability, pizza bake performance, taste, and color characteristics of a cheese composition. Protein can also influence nutritional characteristics. Proteins that can be used in a cheese composition include dairy proteins like casein protein, non-casein dairy proteins, and non-dairy proteins such as vital wheat gluten protein.

Casein protein is an edible protein that can be found naturally in milk and that is conventionally known to provide many important characteristics in cheese compositions. Casein protein is conventionally understood to be at least in part responsible for certain desired functional and organoleptic properties of a cheese composition. As used herein, the term "casein protein" means casein in all its forms, including rennet casein, acid casein, caseinate derivatives, fresh cheese, and dehydrated cheese. A preferred form of casein protein can be rennet casein protein.

Methods of making rennet casein protein are well known. Rennet casein can be produced by precipitation of pasteurized skim milk. The precipitation can be accomplished with use of an enzyme called rennin, which can be of animal or microbial origin. Methods of producing and isolating rennet casein from skim milk are well known. Precipitated rennet casein is typically washed, pressed, dried, ground, sieved, and blended to provide a homogenous powder containing approximately 80 weight percent casein protein. Rennet casein can be commercially purchased from, for example, suppliers such as Kerry Ingredients, Beloit, WI.

A useful amount of rennet casein (or other casein protein) in a cheese composition as described includes an amount that can provide a cheese composition with suitable functional properties, including mechanical properties, organoleptic properties, nutritional properties, and combinations thereof, when included with other cheese composition ingredients as described. Such properties may include melt, stretch, machinability, depositing performance, freeze/thaw stability, pizza bake performance, taste, firmness, and color of a cheese composition. Protein may also influence nutritional characteristics. Exemplary useful amounts include amounts in a range from 10-20 weight percent of the total cheese composition, preferably 11-18 weight percent of the total cheese composition, more preferably 12-18 weight percent of the total cheese composition, and even more preferably 13-17 weight percent of the total cheese composition.

Certain described cheese compositions contain an amount of fiber as an ingredient added to replace some or a portion of a reduced amount of casein protein. The fiber may be soluble, insoluble, or a mixture thereof, and may be any of various known general types of fiber, or fiber species (e.g., cellulose, oat fiber, etc.). Preferred fiber can desirably exhibit no discernible taste or a low level of taste perception. Preferred fiber can desirably exhibit no color, can be white, or can exhibit color that would not impart an undue detrimental affect on the color of a finished cheese composition to which the fiber is added. Preferred fiber can also be low in odor or exhibit no discernible odor. Fiber can exhibit high water retention and high oil retention.

Fiber such as cellulose, oat fiber, and the like, can take a form of a dry powder of concentrated fiber, such as a fiber powder composition that contains less than 1 weight percent moisture, e.g., less than 0.5 weight percent moisture. The powder can be made up of fiber particles that exhibit particles of any useful size. Certain preferred fiber materials, e.g., fiber powder, can be made of particles that exhibit a mean particle size in that is below about 50 microns, e.g., from 10 to 40 microns or from 20 to 35 microns. Particle size and mean particle size are understood features of a powder and may be measured using a "volume average" calculation, e.g., using a Microtrac particle size analyzer.

Fiber ingredients useful in cheese compositions and other food products are well known and commercially available. Commercially available powdered cellulose ingredients can include powdered cellulose derived from plant sources and having a particle length of about 22 microns, less than about 1.5 weight percent soluble fiber, and high water and oil retention properties. Commercially available oat fiber ingredients can include powdered oat fiber derived from oat hulls, having a particle length of about 30 microns, less than 3 weight percent soluble fiber, and high water and oil retention properties.

A useful amount of fiber in a cheese composition as described can be an amount that, with other ingredients (e.g., low trans-fat, starch, non-casein protein), results in a cheese composition as described and preferably having a desirable combination of functional properties as described. An amount of fiber can be an amount that replaces all or a portion of removed casein, optionally in combination with starch, non-casein protein, or both starch and non-casein protein, as described. Exemplary amounts of fiber in a cheese composition can be an amount in a range from 0 to 5 weight percent of the total cheese composition, e.g., 1. to 4 weight percent or 2 to 4 weight percent based on the total weight of the cheese composition.

A cheese composition can also include non-casein protein, which includes non-casein dairy protein, non-dairy protein, and combinations thereof. Non-casein dairy protein includes protein naturally found in milk. Exemplary non-casein, dairy protein includes whey protein (e.g., whey protein concentrate or isolate). Preferred non-casein protein includes non-dairy protein such as vital wheat gluten. Non-casein, non-dairy proteins are well known. For example vital wheat gluten is commercially available from, e.g., ADM Food Ingredients, Olathe, KS, under the trade designation PROVIM ESP. Vital wheat gluten contains approximately 69 weight percent gluten protein.

Suitable non-casein, non-dairy protein includes gluten protein (e.g., vital wheat gluten protein), soy protein, wheat protein, and wheat protein isolate. In certain cheese composition embodiments, non-casein, non-dairy protein can be used to make-up for shortcomings in functional (e.g., mechanical, organoleptic, or nutritional) properties of a cheese composition that has a reduced amount of casein protein, optionally in combination with non-pregelatinized, modified starch, fiber, or both. This combination of non-casein protein and optional starch and fiber can also make up for shortcomings in properties of a cheese composition that can result from using a low amount of trans-fat.

A useful amount of non-casein protein in a cheese composition as described can be a "casein-replacing amount of non-casein protein." A "casein-replacing amount of non-casein protein" refers an amount of non-casein protein that, optionally in combination with one or more of fiber and a suitable non-pregelatinized, modified starch (e.g., non-pregelatinized, thermally-inhibited starch), and optionally in the presence of a low trans-fat, replaces a given amount (reduced amount) of casein protein and provides one or more suitable functional (e.g., mechanical, organoleptic, and nutritional) properties. Exemplary amounts of non-casein protein (including non-dairy protein) include amounts in a range from 1 to 4 weight percent of the total cheese composition, e.g., 1.5 to 3.5 weight percent of the total cheese composition.

Starch can also influence one or more of functional properties of a cheese composition. Certain starches have been identified as being capable of providing excellent formulation flexibility such as, e.g., allowing a fat component to have extremely low amounts of trans-fat and allowing casein protein to be reduced to unconventional levels when used in combination with non-casein protein (preferably non-dairy protein), fiber, or both.

In particular, non-pregelatinized, modified starch can be useful as described. As used herein a "modified" starch means that the structure of starch has been modified chemically, thermally, or by other means developed in the future, to alter the viscosity of the starch in water. Preferred non-pregelatinized, modified starch includes non-pregelatinized, thermally-inhibited starch. As a raw material to be used in making cheese compositions, non-pregelatinized, modified starch is typically procured in the form of starch granules.

As used herein, the term "non-pregelatinized" modified starch granule means a starch granule that is insoluble in cold water and appears birefringent when seen under polarized light with a microscope. Non-pregelatinized, modified starch (also known as cook-up starch) tends to gradually thicken upon heating. Pregelatinized starch can tend to develop a higher viscosity too quickly for use in embodiments of cheese compositions as described. Preferred raw material starch granules include non-pregelatinized, thermally-inhibited starch granules.

During one or more stages of a cheese-making process, non-pregelatinized, modified starch granules can and typically do become gelatinized. Gelatinization is a series of changes that starch undergoes when heated in excess water, which solubilizes the starch and results in increased viscosity and disappearance of birefringence. Also during one or more stages of a cheese-making process, non-pregelatinized, modified starch granules can break down or reduce in size to a certain degree as a result of one or more of heating, mixing, and shearing the granule in a cheese composition. A non-pregelatinized, modified starch that is resistant to such breakdown can tend to provide suitable viscosity characteristics during processing. Such a non-pregelatinized, modified starch is likely to satisfy the Starch Viscosity Test (described below). The resistance to granule breakdown results in a starch granule in the final cheese composition that is relatively larger in size (e.g., larger cross-sectional area) as compared to a starch granule that is not as resistant to such breakdown during processing.

Figure 2:
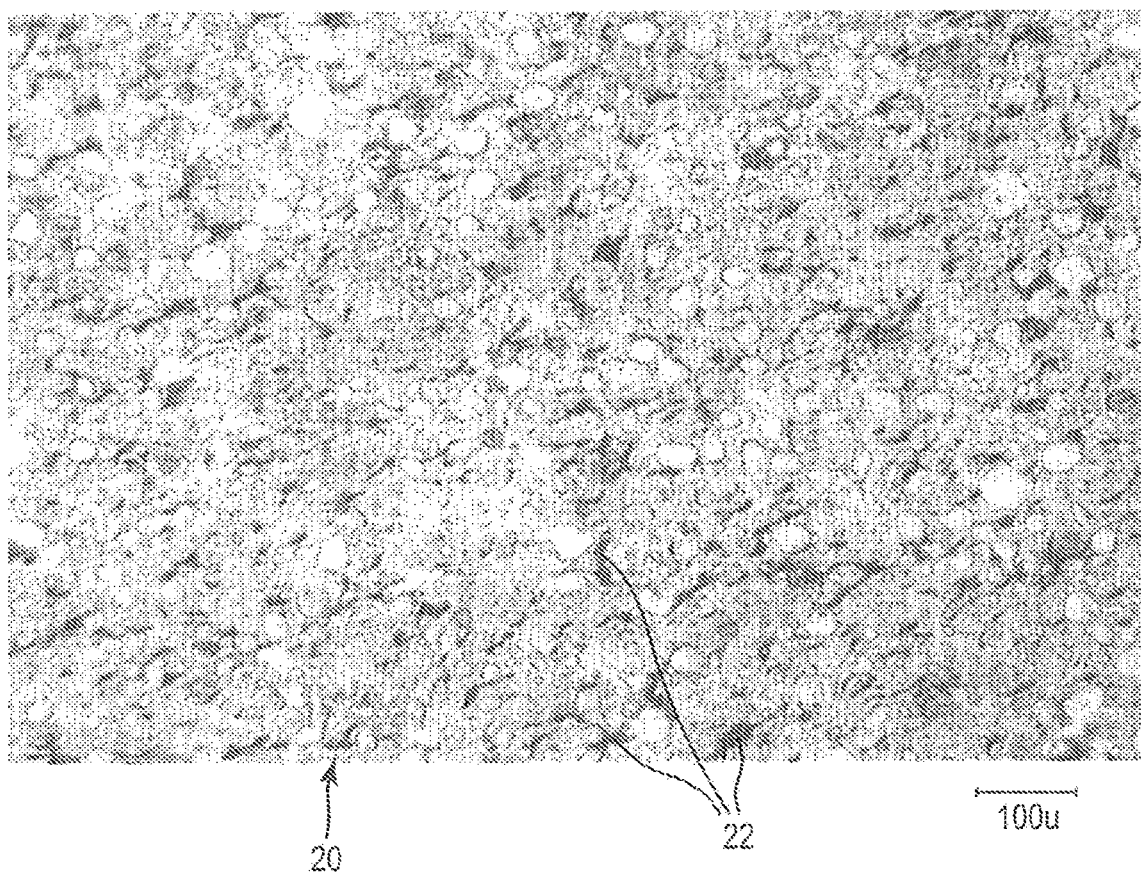
FIG. 2 is a photomicrograph of a cross-sectional view of a cheese composition that includes chemically-modified starch.

FIG. 1 illustrates a cheese composition that includes a combination of non-pregelatinized, thermally-inhibited starch, gluten protein, and a reduced amount of casein protein (but does not include interesterified fat or a fiber ingredient). FIG. 2 illustrates a comparative cheese composition that also does not include interesterified fat or a fiber ingredient. FIGS. 1 and 2 illustrate two cheese compositions that are identical except that the cheese in FIG. 1 includes the combination of non-pregelatinized, thermally-inhibited starch and gluten protein to reduce an amount of casein protein, whereas, the cheese in FIG. 2 includes a chemically-modified starch that does not satisfy the Starch Viscosity Test (described below) and does not include the gluten protein. The effective diameter of the starting raw material starches used in FIGS. 1 and 2 were roughly identical.

FIG. 1 is a photomicrograph of a cheese composition 10 using a non-pregelatinized, thermally-inhibited starch (obtained from National Starch and Chemical Company, Bridgewater, NJ, under the trade designation NOVATION 1600) and a non-casein protein (obtained from ADM Food Ingredients under the trade designation PROVIM ESP GLUTEN). The starch granules 12 remain largely intact after processing (e.g., heating and mixing). The starch granules 12 (shown in black) are stained in dark blue from iodine and have a mean area of 780 square micrometers. The average equivalent diameter is 27 micrometers. Equivalent diameter (ED) is a diameter the granule would have if the granule were round. ED can be calculated as two (2) times the square root of the area divided by Pi as follows:

$$ED = 2 \times \sqrt{\frac{Area}{\pi}}$$

FIG. 2 is a photomicrograph of a comparative cheese composition 20 using a particular chemically-modified starch that does not satisfy the Starch Viscosity Test (described below). Here, the starch granules 22 have degraded relatively more after processing (e.g., heating and mixing) than the non-pregelatinized, thermally-inhibited starch granules used in FIG. 1. The starch granules 22 are stained in dark blue from iodine and have a mean area of 239 square micrometers. The average equivalent diameter is 16 micrometers.

The average granule areas in FIGS. 1 and 2 were obtained using the method for microscopic examination described below. A ½" cube was cut from each cheese sample and frozen. These samples were cut into 20 micrometer sections with a cryostatic microtome. The sections were stained with an aqueous iodine solution. The starch used in these cheeses stains dark blue. Representative fields were imaged in a microscope (obtained from Carl Zeiss International, Oberkochen, Germany under the trade designation ZEISS UNIVERSAL) using transmitted light. Images were acquired with a camera (obtained from Sony Corporation, Tokyo, Japan having model number 760 CCD). The mean starch area was determined with an image analyzer (obtained from Leica Camera AG, Solms, Germany, having model number Leica QWin 550).

Figure 7:
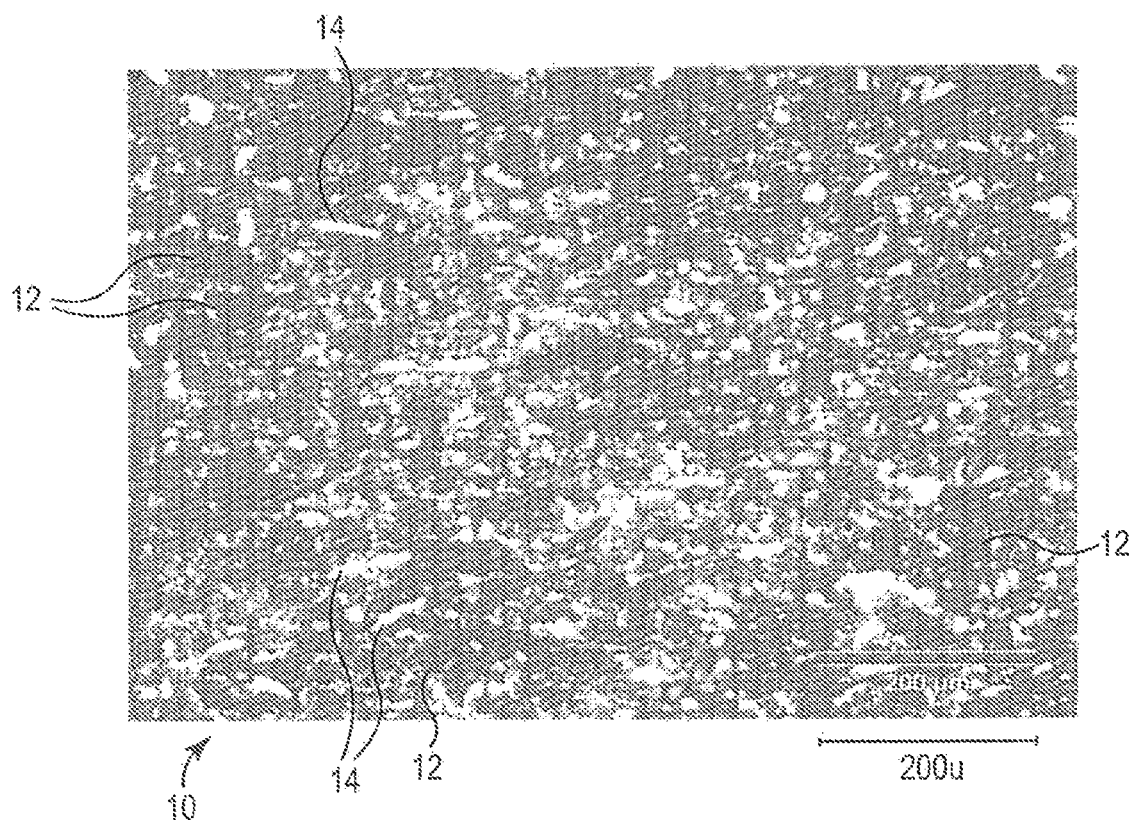
FIG. 7 is a photomicrograph of a cross-sectional view of a cheese composition that includes fiber.

FIG. 7 shows a composition like that of FIG. 1, except that the FIG. 7 composition includes a fiber ingredient, and the FIG. 7 composition includes interesterified low-trans fat (while the FIG. 1 composition does not include fiber or interesterified fat). The following observations can be made of the FIG. 7 composition. The fat particles (medium gray in color) in the cheese composition of the FIG. 7 photomicrograph exhibit relatively smaller particle size distribution, and the particles are relatively more irregular in shape, compared to formulation at FIG. 1. Also, the cellulose fibers 14 (elongate white-colored fiber particles) appear to be evenly distributed and have not disrupted the matrix.

Non-pregelatinized, thermally-inhibited starch granules can exhibit an advantageously high resistance to breakdown, e.g., breakdown as the result of heating or mixing the granule in a cheese composition. Although wishing to not be bound by theory, it is believed that non-pregelatinized, thermally-inhibited starch tends to exhibit relatively better internal strength as compared to other starch granules. The improved internal strength can tend to make the non-pregelatinized, thermally-inhibited starch granules more resistant to physical or thermal degradation during a cheese making process. Such resistance to granule degradation can beneficially result in improved processing capabilities of an in-process cheese composition, such as reduced viscosity during mixing and heating.

Accordingly, a method for identifying useful or preferred starches is to determine if a starch satisfies the Starch Viscosity Test, which is described below. Because suitable internal strength (i.e., suitable resistance to granule breakdown) of starch granules is thought to be correlated to desirable viscosity characteristics of an in-process cheese composition, the Starch Viscosity Test is thought to be a measure of the internal strength of a starch granule.

Starch Viscosity Test

The Starch Viscosity Test can be employed using a Brabender VISCO-AMYLOGRAPH instrument (obtained from C.W. Brabender Instrument, Inc., South Hackensack, NJ) capable of 75 rpm with a 700 cm gm cartridge. Prior to the Starch Viscosity Test, the starch is analyzed for moisture, so appropriate adjustments due to moisture can be made. For this test, 5 percent by weight of the total test suspension of starch dry solids are used. To obtain this, 25 grams of starch (dry basis) are weighed and transferred to a beaker. Distilled water is added to provide a total weight of 400 grams to suspend the starch. The suspension is poured into a viscograph bowl. The pH of the suspension is adjusted to 6 via addition of dilute HCl or NaOH. The beaker is rinsed with 100 grams of distilled water minus the weight of the water used for the pH adjustment (total test suspension weight is 500 g). The VISCO-AMYLOGRAPH is started and records viscosity in Brabender units throughout the following heating schedule:

Step 1: Heat suspension at 1.5° C./min from 25 to 95° C. while stirring at 75 rpm, Step 2: Hold starch at 95° C. while stirring for 15 minutes, and Step 3: Cool to 50° C. at 1.5° C./min while stirring.

A starch is considered to satisfy the Starch Viscosity Test if when heated in a Brabender VISCO-AMYLOGRAPH as a 5% dry solids starch solution having a pH of 6, from 25° C. to 95° C. at a rate of 1.5° C./min, the solution exhibits a viscosity in the range from about 100 to about 1200 Brabender units at time=0 (i.e., beginning of the hold period) and exhibits a viscosity in a range from about 200 to about 1400 Brabender units after a 15 minute hold at 95° C.

Figure 3:
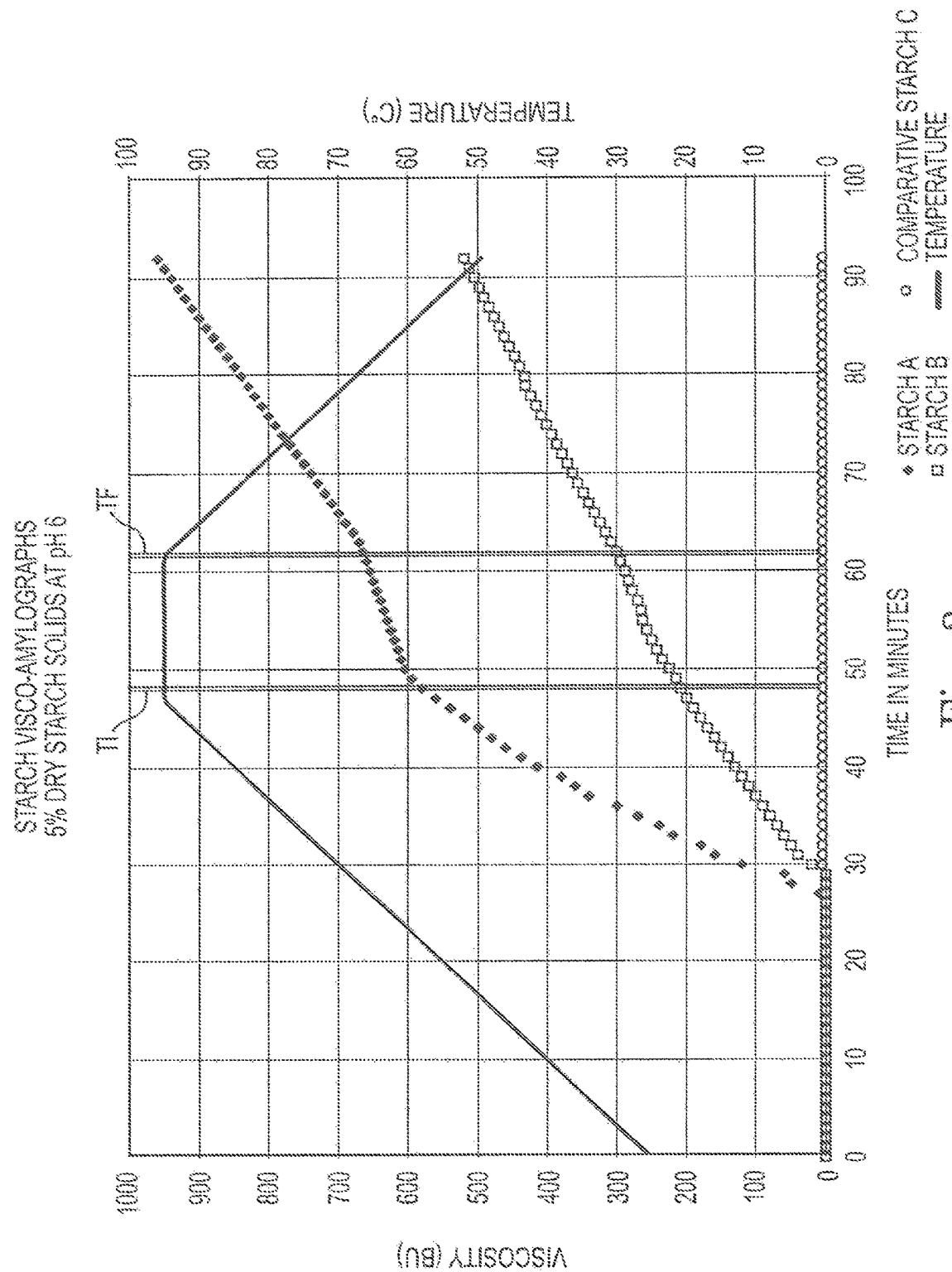
FIG. 3 is a graph showing the results of various starches used in the Starch Viscosity Test.

FIG. 3 illustrates the results of certain starches tested according to the Starch Viscosity Test. "TI" is the beginning of the hold period and "TF" is the end of the hold period. The comparative starch C is a chemically modified starch that does not satisfy the Starch Viscosity Test. Example Starch A is thermally inhibited potato starch that satisfies the Starch Viscosity Test. Starch B is a chemically modified potato starch that satisfies the Starch Viscosity Test.

Non-pregelatinized, modified starches, e.g., thermally-inhibited starches, as well as methods for making these starches, are known; see, e.g., U.S. Pat. Nos. 5,725,676; 5,932,017; 6,231,675, the disclosures of which are incorporated herein by reference. Non-pregelatinized, modified starch can be procured from one or more sources such as corn, potato, sweet potato, wheat, rice, sago, tapioca, sorghum, and other plant sources. Preferred non-pregelatinized, modified starch includes potato starch. Potato starch tends to provide cheese compositions with suitable organoleptic properties such as taste and texture. Non-pregelatinized, thermally-inhibited starches are commercially available, for example from National Starch and Chemical Company, Bridgewater, NJ, under the trade designation NOVATION 1600.

Starch, e.g., non-pregelatinized, modified starch, is an optional and not a required ingredient in a cheese composition as described. If used, a suitable amount of non-pregelatinized, modified starch is an amount that provides formulation flexibility when used in combination with other ingredients as described, such as casein protein in an amount as described, optional fiber, and fat that is optionally a low trans-fat and optionally an interesterified fat. An exemplary amount of non-pregelatinized, modified starch (e.g., thermally-inhibited starch) can be an amount that when included with other described ingredients allows the trans-fat content of the fat component to be low (e.g., about 5% or less by weight of trans-fat based on the total weight of the fat component). Alternately stated, if present at all, an exemplary amount of non-pregelatinized, modified starch (e.g., non-pregelatinized, thermally-inhibited starch) can be in a range from 1-6 weight percent of a total cheese composition, e.g., from 2 to 5 weight percent, or from 2.5 to 3.5 weight percent based on total weight cheese composition.

An emulsifying salt can be included in a cheese composition, to allow casein protein to become hydrated. Exemplary emulsifying salt include monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, sodium potassium tartrate, and combinations thereof. Preferred emulsifying salt includes one or more of trisodium phosphate, sodium citrate, alkaline sodium aluminum phosphate, and dibasic sodium phosphate.

Emulsifying salts and methods of making them are well known. One useful emulsifying salt is commercially available from Rhodia Food, Cranbury, NJ, under the trade designation KASAL. KASAL is an emulsifying salt blend of about 70 weight percent alkaline sodium aluminum phosphate and about 30 weight percent dibasic sodium phosphate.

Exemplary amounts of emulsifying salt in a cheese composition can include an amount of less than about 3 percent by weight of the total cheese composition, preferably less than about 2 percent by weight of the total cheese composition.

Water is preferably used in a cheese composition as described. An exemplary amount of water includes an amount in the range from about 45 to about 55 percent by weight of the total cheese composition.

Various other ingredients known in the food and cheese composition arts may be included in a cheese composition. Such optional ingredients include acidifying agent, cream, milkfat, milk, salt, harmless artificial coloring, spice, or flavoring, mold-inhibitor, nutritional supplements, gums, organic emulsifying salts, and other types of cheese.

Acidifying agent can include one or more of vinegar, lactic acid, citric acid, acetic acid, and phosphoric acid.

Mold inhibitor can include one or more of the following in a total amount of no more than about 0.2 percent by weight of the total cheese composition: sorbic acid, potassium sorbate, and sodium sorbate. Mold inhibitor can also include one or more of the following in a total amount of no more than about 0.3 percent by weight of the total cheese composition: sodium propionate, calcium propionate. Mold inhibitor can also include nisin.

According to this description, cheese compositions with one or more suitable functional, organoleptic, or nutritional characteristics can be formulated to contain a reduced amount of casein protein, a low trans-fat, an amount of water, emulsifying salt, and optionally one or more of fiber, non-casein protein, and non-pregelatinized, modified starch. In preferred methods, cheese compositions may include casein protein, low trans-fat, water, and fiber in such as cellulose or oat fiber, optionally and preferably also vital wheat gluten protein and non-pregelatinized, thermally-inhibited starch. The low trans-fat can be interesterified and exhibit a melting point and Solid Fat Content to result in useful melt point and Solid Fat Content (see Table 1), and to provide desired properties of the final cheese composition, e.g., a Firmness Test Value of at least 2 or 3 kg(force).

This description also includes methods of making cheese compositions as described. In one embodiment, the description shows a method of preparing a cheese composition that includes a reduced amount of a casein protein, and that also includes an amount of fiber. In an alternate embodiment, a method includes preparing a cheese composition that includes a reduced amount of casein protein, and that also includes a fat that is a low-trans interesterified fat that exhibits a solid fat content value as follows: between 20 to 40 percent at 10 C and below 15 percent at 40 C; alternately 22-34 percent at 10 C, 18-27 percent at 21.1 C, 10-18 percent at 26.7 C, 8-17 percent at 33.3 C, and 6-15 percent at 40 C. In other embodiments, methods include preparing a cheese composition that has a reduced amount of a casein protein, and that also includes a fat that is a low-trans interesterified fat that exhibits a melting point of from 120 F to 145 F, e.g., from 125 F to 140 F, as measured by a Mettler Dropping Point testing procedure. According to any of these methods, other ingredients can optionally also be included in the cheese composition to improve functional properties, such as a starch or a non-casein protein. The starch can preferably be a non-pregelatinized, modified starch that satisfies the Starch Viscosity Test described herein.

In another embodiment, the description shows a method of preparing a cheese composition containing casein protein in an amount in a range below 20 percent by weight of the total cheese composition. The cheese composition can include one or more of fiber, non-casein protein, starch, and low-trans-fat oil as described and optionally as preferred according to the present description. The ingredients are include in amounts as described, to provide a cheese composition having desired functional properties including a Firmness Test Value of at least 2 or 3 kg (f).

A method of making a cheese composition can involve providing ingredients to include: fat; casein protein; a casein-replacing amount of one or more of fiber, non-casein protein, starch such as non-pregelatinized, modified starch, or two or more of these; emulsifying salt; and water. The fat may optionally be a low trans-fat, e.g., a low-trans interesterified fat having a Solid Fat Content, melting point, or both, as described at Table 1 or elsewhere herein. The selected ingredients are combined with mixing and heating to provide a heated mixture. The heated mixture can be cooled to form a cheese composition that can be in the form of a mixture or an emulsion. In some embodiments the non-pregelatinized, modified starch is non-pregelatinized, thermally-inhibited, potato starch. In these or other embodiments, the non-casein protein is vital wheat gluten. Preferred cheese compositions prepared according to the methods exhibit useful cheese properties, and preferably exhibit a Firmness Test Value of at least 2 or 3 kg(f).

Methods of making a cheese composition as described can involve any useful processing equipment and processing steps, such a commercially available cheese cooker. An example of a useful cooker is a variable speed, twin screw, steam injected cheese cooker from Custom Stainless Steel Equipment, Santa Rosa, CA, having model CDB-0412FJD.

In general, the cheese cooker system is allowed to warm up. Next, ingredients are added to the cooker and the ingredients are heated. Ingredients can be added in one group or at different times. The ingredients are then mixed, while the temperature is maintained at an elevated state, with the composition being in the form of a mixture or an emulsion. The ingredients are then cooled to form a final cheese composition in the form of a mixture or an emulsion. A more specific example of a cheese composition being made using a cheese cooker having model number CDB-0412FJD from Custom Stainless Steel Equipment, Santa Rosa, CA, is as follows.

First the cheese cooker can be readied by setting the steam to a pressure of about 40 psi. Condensate valves can then be opened to allow the steam to flow through the pipes. Once the condensate has been cleared, the steam is directed through the cheese cooker by closing the steam outlet valve. The steam is sent through the injection ports to ensure that the ports are open and unplugged.

The cover to the mixer portion of the cheese cooker is then closed and the cheese cooker is allowed to warm up. After the mixer has been sufficiently heated, the steam valves on the cheese cooker are closed. Some of the ingredients, if necessary, can be mixed separately, or melted. For example, if semi-solid shortening is used, it may need to be melted before being added to the cooker. Typically, water is added to the cooker and allowed to warm to a desired temperature before adding other ingredients.

The steam drain valves on the cheese cooker are opened again to clear condensate. The agitator is started and water is added to the cooker. The steam valves are then opened and steam is allowed to enter the cooker through the injection ports. The cover is closed and the temperature is allowed to rise to a temperature in the range from about 175° F. to about 200° F. (about 79° C. to about 93° C.) while mixing is maintained.

Once the water is heated, emulsifying salt can be added and allowed to dissolve before ingredients are added to the cheese cooker. The agitation speed is controlled to ensure proper mixing. If the temperature of the ingredients has lowered, the ingredients are heated to a temperature in the range from 175° F. to 185° F. (about 79° C. to about 85° C.) by closing the mixer cover and adding more steam to the cooker. Caution should be taken to prevent addition of an excessive amount of steam, which could cause addition of too much water to the overall mixture. The steam is then shut off and the cover opened to allow visual confirmation of a final cheese composition product. The mixer should remain running to obtain a homogenous mixture. The temperature should be maintained at about 170° F. (about 76° C.). The cheese composition should begin to solidify and a creamy texture should result. The transformation should occur between 2 and 8 minutes after the last ingredient has been added to the cooker. When the formation of the cheese composition is complete, the molten cheese composition is drained into a container. The final cheese composition can then cool to a temperature in the range from about 32° F. to about 40° F. (about 0° C. to about 5° C.) and can then be further processed if desired.

Cheese compositions as described are typically used as edible food products or are further processed and eventually formed into cheese compositions that can be used as an edible food product.

A final cheese product can be packaged alone or combined with other food products before packaging. Examples of final cheese products packaged alone include string cheese, shredded cheese (e.g., shredded mozzarella cheese and shredded cheddar cheese), and block cheese. Final cheese products can be combined with other food products before being packaged. Such cheese products can be incorporated or combined with other food products in any suitable way. For example, a final cheese product can be applied in any suitable form (e.g., shredded) to another food product such as pizza. As another example, a final cheese product can be injected in into a food product that includes cheese (e.g., snack food including pizza-type snack food and the like). A cheese composition can also be packaged, alone or in combination with other food ingredients, frozen, and stored for delayed use and consumption.

In certain embodiments, a cheese composition or a food product including the same can be marketed as having a low or a comparatively reduce level of trans-fat content. For example, a packaged food product including a cheese composition as described can include indicia such as labeling that identifies at least the cheese composition as having a low amount of trans-fat (e.g., about 2% or less of trans-fat by weight of the fat component). Or, the packaged food product could have labeling that indicates that the cheese composition has a comparatively reduced amount of trans-fat content, yet exhibits a desirable property such as melt, firmness, stretch, crumble, texture, or a combination of these.

Test Protocols

A. Determination of Solid Fat Content of a Fat Ingredient

As used herein the term "Solid Fat Content" means the weight percent of solid fat based on the total weight of a given fat ingredient at a particular temperature. A fat ingredient can be measured for Solid Fat Content using a Bruker Minispec using the American Oil Chemist's Society (AOCS) Official Method Cd 16b-93 revised 1999, Solid Fat Content (SFC) by Low-Resolution Nuclear Magnetic Resonance—The Direct Method.

B. Determination of Stretch Test Value for a Cheese Composition

As used herein the term "Stretch Test Value" means the value assigned to a cheese composition after applying the following test protocol on the cheese. An oven is preheated to 450° F. A wedge of cheese is sliced to a thickness of about 0.5 inches. A disc-shaped piece of cheese is cut from the wedge using a metal circular cutter (39.2 mm diameter, 7.3 mm deep). The weight of the disc of cheese should be between 8.5 and 8.9 grams (trim disc with circular cutter if needed). The disc of cheese is then placed in the center of a 15 mm×100 mm glass Petri dish. Then the cover of the Petri dish is placed over the Petri dish and the dish is placed in the oven for exactly 5 minutes. The Petri dish is then removed from the oven and allowed to cool for about 30 seconds. The cover is removed and a fork is wedged into the cheese disc and pulled upwards so as to stretch the cheese. The length that the cheese can be stretched until breaking is measured and recorded. A good sample, preferably a cheese composition as described, will have a Stretch Test Value of 15 inches or more. The appearance of the cheese disc is also observed and recorded. A satisfactory cheese should not be burnt and a minimum to no amount of free oil or water should be visible.

C. Determination of Melt Test Value for a Cheese Composition

As used herein the term "Melt Test Value" means the value assigned to a cheese composition after applying the following test protocol on the cheese. The procedure for determining a Melt Test Value is as similarly described above with respect to determining a Stretch Test Value with the added steps of measuring the "spread" of the cheese after it has been baked. Two perpendicular measurements of spread are taken and averaged in millimeters and converted into a Melt Test Value according to the following conversions:

| mm | Melt Test Value | mm | Melt Test Value |
| --- | --- | --- | --- |
| 39.8 | 1 | 43.05 | 1.5 |
| 46.3 | 2 | 49.55 | 2.5 |
| 52.8 | 3 | 56.05 | 3.5 |
| 59.3 | 4 | 62.55 | 4.5 |
| 65.8 | 5 | 69.05 | 5.5 |
| 72.3 | 6 | 75.55 | 6.5 |
| 78.8 | 7 | 88.55 | 7.5 |

An acceptable Melt Test Value includes such values greater than or equal to 3.5.

D. Determination of Crumble Test Value for a Cheese Composition

As used herein, the term "Crumble Test Value" means the value assigned to a cheese composition after applying the following test protocol on the cheese. Cut cheese into large cubes and then shred the cubed samples using a Hobart shredder. Take a handful of the shredded cheese and squeeze the shreds firmly into the shape of a ball with the palm side of hand. Then rub the cheese ball firmly with the other hand over a container and rate the appearance of the shreds. A perfect shred will maintain its shape under moderate stress and therefore have a Crumble Test Value of 1. A poor shred will crumble into small pieces under small stress and therefore have a Crumble Test Value of 5. Desired levels of crumble (Crumble Test Value) are 1-2.5.

E. Determination of Stickiness Test Value for a Cheese Composition

As used herein the term "Stickiness Test Value" means the value assigned to a cheese composition after applying the following test protocol on the cheese. Cut cheese into large cubes and then shred the cubed samples using a Hobart shredder. Take a handful of the shredded cheese and squeeze the shreds firmly into the shape of a ball with the palm side of hand. Then bounce the cheese ball several times in hand over a container. A perfect shred will fall apart easily into its original shreds and therefore have a Stickiness Test Value of 1. A poor shred will stick to the other shreds and therefore have a Stickiness Test Value of 5. Acceptable levels of stickiness are 1-2.5.

F. Determination of Firmness Test Value for a Cheese Composition

As used herein, the term "Firmness Test Value" means the value assigned to a cheese composition after applying the following test protocol on the cheese. A Firmness Test Value can be obtained from a TA.XTPlus Texture Analyzer. A desired Firmness Test Value includes a measurement in the range from 3.5 to 7 kg(force) or as otherwise described herein.

Representative embodiments of the invention will now be described with reference to the following examples that illustrate the principles and practice of the invention.

EXAMPLES

Examples 1 and 2

These examples illustrate that casein protein content in a substitute cheese composition can be reduced by adding in an amount of fiber, which is cellulose in examples 1 and 2. These examples also include amounts of non-casein protein (e.g., vital wheat gluten) and non-pregelatinized, chemically modified potato starch.

Example Formulas

|  | Example 1 | Example 2 |
| --- | --- | --- |
| water plus steam | 46.7% | 46.7% |
| Kasal | 1.4% | 1.4% |
| sodium citrate | 0.2% | 0.2% |
| tri sodium phosphate | 0.2% | 0.2% |
| rennet casein | 16.1% | 16.1% |
| vital wheat gluten | 3.9% | 2.8% |
| soy oil | 23.9% | 23.9% |
| salt (NaCl) | 0.7% | 0.7% |
| potato starch | 2.8% | 2.8% |
| potassium chloride (KCl) | 0.9% | 0.9% |
| citric acid | 0.5% | 0.5% |
| potassium sorbate | 0.2% | 0.2% |
| Vitamin/mineral blend | 0.1% | 0.1% |
| powdered cellulose | 2.7% | 3.8% |
| Total | 100.0% | 100.0% |

All patents, patent documents, and publications cited herein are incorporated by reference as if individually incorporated. Unless otherwise indicated, all parts and percentages are by weight of the total composition. The foregoing detailed description has been given for clarity of understanding only. No unnecessary limitations are to be understood therefrom. The invention is not limited to the exact details shown and described, for variations obvious to one skilled in the art will be included within the invention defined by the claims.

The invention claimed is:

1. A cheese composition comprising:
   from 20 to 30 weight percent interesterified fat having a Solid Fat Content in the range from 20 to 40 weight percent at 10 degrees Celsius and less than 15 weight percent at 40 degrees Celsius, and a melting point in the range from 120 to 145° F.;
   casein protein in an amount of not greater than 20 weight percent;
   emulsifying salt; and
   from 25 to 50 weight percent water.

2. A cheese composition as recited at claim 1 wherein the interesterified fat has a Solid Fat Content value in a range from
   22-34 weight percent at 10° C.,
   18-27 weight percent at 21.1° C.,
   10-18 weight percent at 26.7° C.,
   8-17 weight percent at 33.3° C., and
   6-15 weight percent at 40.0° C.

3. A cheese composition according to claim 1, wherein the melting point of the interesterified fat is in the range from 125 to 140° F.

4. A cheese composition according to claim 1, comprising:
   from 1 to 5 weight percent non-casein protein, and
   from 1 to 6 weight percent starch.

5. A cheese composition according to claim 1, wherein the fat contains not more than about 5 weight percent trans-fat, based on the total weight of the fat.

6. A cheese composition according to claim 1, further comprising non-pregelatinized, modified starch.

7. A cheese composition according to claim 6, wherein the non-pregelatinized, modified starch has a viscosity value, according to the Starch Viscosity Test using 5% dry starch solids, in a range from 100-1200 Brabender units at the beginning of a 95° C. hold period and in a range from 200-1400 Brabender units after 15 minutes from the beginning of the hold period.

8. A cheese composition according to claim 1, wherein the cheese composition has a Melt Test Value greater than or equal to 3.5.

9. A cheese composition according to claim 1, wherein the cheese composition has a Stretch Test Value of at least 15 inches.

10. A cheese composition according to claim 1, wherein the cheese composition has a Crumble Test Value in the range from 1.0 to 2.5.

11. A cheese composition according to claim 1, wherein the cheese composition has a Melt Test Value greater than or equal to 3.5, a Stretch Test Value of at least 15 inches and a Crumble Test Value in the range from 1.0 to 2.5.

12. A cheese composition according to claim 1, wherein the cheese composition further comprises fiber.

13. A cheese composition according to claim 12, wherein the fiber is at least 97 percent insoluble fiber.

14. A cheese composition according to claim 13, wherein the fiber constitutes from 1 to 5 weight percent of the cheese composition.

15. A cheese composition according to claim 12, wherein the fiber consists of oat fiber having a particle size in a range from 20 to 40 microns.

16. A cheese composition according to claim 1, wherein the composition is devoid of starch.

17. A cheese composition according to claim 1, wherein the interesterified fat comprises soybean oil and hydrogenated soybean oil.

\* \* \* \* \*